No. 831,170. PATENTED SEPT. 18, 1906.
F. M. LUPTON.
BREAD CRUMBER.
APPLICATION FILED JULY 29, 1905.
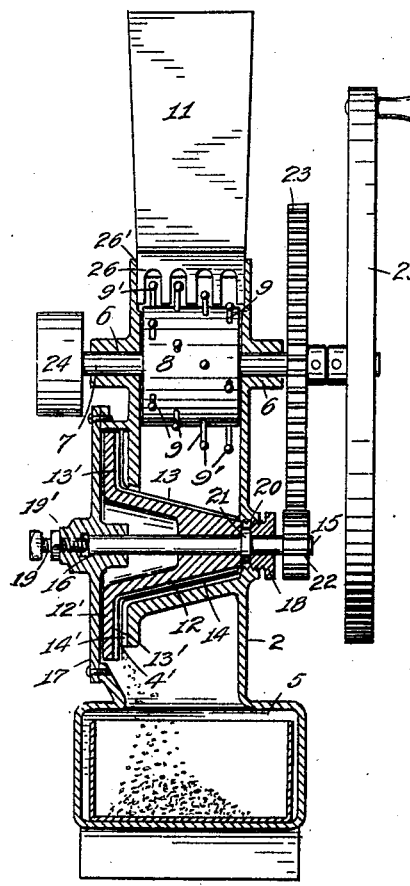
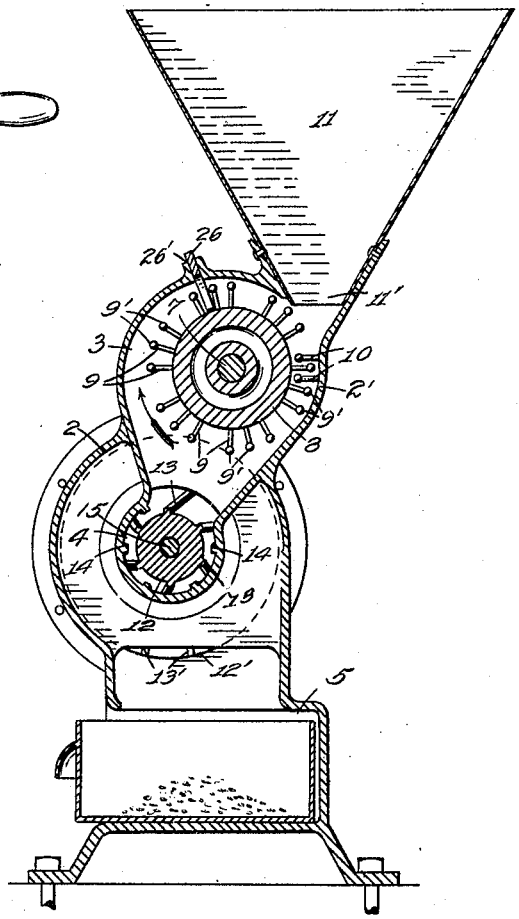
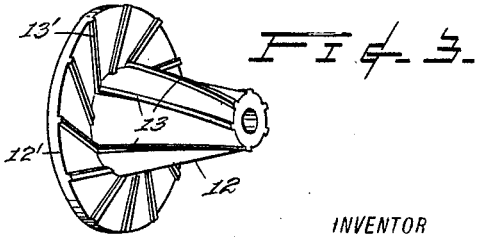
WITNESSES:
Paul Barnes
Osborne Willson
INVENTOR
F. M. Lupton
BY
Pierre Barnes
ATTORNEY

UNITED STATES PATENT OFFICE.

FRANK M. LUPTON, OF SEATTLE, WASHINGTON.

BREAD-CRUMBER.

No. 831,170.  Specification of Letters Patent.  Patented Sept. 18, 1906.

Application filed July 29, 1905. Serial No. 271,788.

*To all whom it may concern:*

Be it known that I, FRANK M. LUPTON, a citizen of the United States, residing at Seattle, in the county of King and State of Washington, have invented certain new and useful Improvements in Bread-Crumbers, of which the following is a specification, reference being had therein to the accompanying drawings, in which—

Figure 1 is a longitudinal section of a machine embodying my invention. Fig. 2 is a transverse section of the same, and Fig. 3 is a perspective view of a rotary grinding device shown in the other views.

The object of my invention is to produce a machine of simple and inexpensive construction by which bread may be expeditiously disintegrated and ground into crumbs for culinary purposes and at the same time to have such a machine so formed or constructed as to give easy access to its several operative parts for the purposes of cleaning or repairing the same.

The invention consists in the novel construction and combination of parts, as will now be described in connection with said drawings.

The reference-numeral 2 designates the machine-casing provided with compartments 3, 4, and 5. Extending longitudinally through the compartment 3 and journaled in suitable bearings 6 of the casing is a power-shaft 7, upon which is fixedly mounted a cylinder 8 interiorly of the casing. Formed or provided on the peripheral surface of the cylinder is a plurality of radially-projecting teeth 9, desirably terminating at their outer ends in enlarged heads 9'. These teeth are of lengths so that in revolving their outer ends will extend into close proximity of the concave wall 2', wherefrom protrude intervening teeth 10. Secured to or formed with the casing is a superposed hopper 11, into which pieces of bread are delivered and from which they are discharged through the contracted opening 11' into the compartment 3 and immediately above the teeth 10 and in position to be engaged by the revolving teeth of the cylinder when the latter is rotated in the direction indicated by the arrow in Fig. 2, whereby the bread is disintegrated. The bread thus broken or torn into fragments drops into the communicating compartment 4 therebelow, wherein rotates a grinder 12, having its main portion of conical shape and provided at its greater diameter with a peripheral flange 12'. The conical portion of this grinder (see Fig. 3) is provided with helically-disposed ribs 13 and the adjacent face of the flange with ribs 13', which are inclined somewhat from the plane of flange 12. The compartment 4, containing this grinder, is of substantially similar shape thereto, and the opposing walls are severally provided with protruding ribs 14 14', which are, however, directed oppositely to those of the grinder.

The bread in passing through the compartment 4 will be finely disintegrated and delivered through the discharge-orifice 4' thereof into a removable receiving-pan placed in the compartment 5. The grinder 12 is fixedly mounted upon a shaft 15, journaled in a bearing 16 of a detachable cover 17 of the casing and a bushing 18 in the opposite wall of the casing.

To furnish means for adjustably changing the longitudinal position of the grinder to regulate the coarseness of the crumbs, I provide at one of its ends a set-screw 19, passing through a threaded socket 19' of the cover 17, and form external threads upon said bushing which register with threads cut in the aperture 20 of the case and have the inner end of the bushing bear against a collar 21 of the shaft 15. This shaft is driven by means of toothed gear-wheel 22 thereon meshing with a like wheel 23 on the other shaft, which in turn is driven either through power means, as by a belt passing about a pulley 24, or a manually-rotated crank-wheel 25.

A comb-like device 26 is inserted through a slot 26' of the case in proximity of the hopper for the purpose of removing any pieces of bread which may cling to the cylinder or its teeth.

Having described my invention, what I claim as new, and desire to secure by Letters Patent, is—

In combination with a casing, two communicating compartments, grinding means in one compartment, a conical grinder in the other compartment, a ribbed flange on said grinder, said last-named compartment having ribs therein, ribs on the casing coöperating with said ribs of the grinder-flange, a shaft for the grinder, a cover inclosing said flange, said cover being formed with a pair of sockets, projecting on opposite sides thereof, one end of said shaft being received in the socket on the interior of the cover, the opposite socket being threaded and having a set-screw therein engaging said end of the shaft, a threaded bushing in the casing through which the opposite end of the shaft passes, a collar rigid on said shaft and engaging the bushing, whereby said shaft may be moved longitudinally by the rotation of said bushing or said set-screw, and means for operating said grinding means and said grinder in unison.

In testimony whereof I affix my signature in presence of two witnesses.

FRANK M. LUPTON.

Witnesses:
 PIERRE BARNES,
 OSBORNE WILLSON.